May 8, 1962
M. J. CORBETT
3,032,979
CONTROLLED FEED ROCKET ENGINE
Filed Jan. 2, 1959
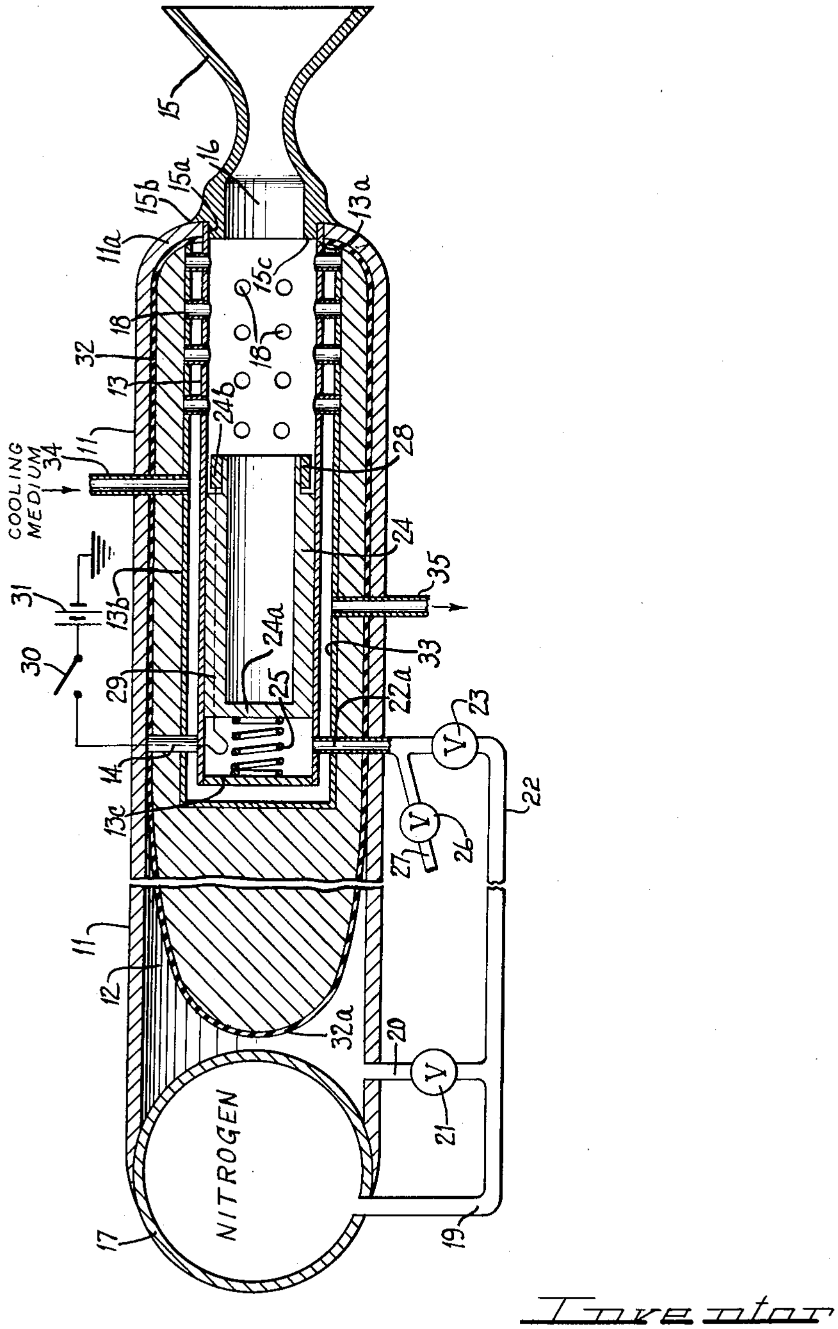
Inventor
Marshall J. Corbett
by Hill, Sherman, Meroni, Gross & Simpson Attys United States Patent Office 3,032,979
Patented May 8, 1962

3,032,979
CONTROLLED FEED ROCKET ENGINE

Marshall J. Corbett, Cleveland, Ohio, assignor to Thompson Ramo Wooldridge, Inc., Cleveland, Ohio, a corporation of Ohio Filed Jan. 2, 1959, Ser. No. 784,512
5 Claims. (Cl. 60—35.6)

This invention relates to a rocket engine. More particularly, this invention relates to a rocket engine adapted to burn a gelatinous mono-propellant fuel and wherein fuel extrusion apertures are arranged longitudinally of an elongated combustion chamber mounted entirely inside of an elongated fuel tank in order to achieve an over-all rocket structure having an elongated shape of minimum cross-sectional area or diameter.

It is a feature of the present invention to provide a rocket engine having a fuel tank which may be of generally cylindrical cross-section which is adapted to preferably contain a gelatinous mono-propellant fuel which has flow and consistency characteristics such that it is normally extruded into a combustion chamber through a plurality of burner tubes, apertures, nozzles or the like. It has previously been the practice in this type of rocket engine to mount the combustion chamber into which the fuel is to be extruded externally of and at one end of the fuel tank, the fuel being extruded to burners arranged throughout a frontal area transverse of or forming a cross-section of the fuel tank or supply inlet. In order to achieve desired high values of thrust, resulting from a large fuel burning area, this known type of construction requires a combustion chamber and hence, an over-all rocket cross-sectional area or diameter of larger size than is frequently desirable from the point of view of the aerodynamic structural considerations pertinent to achieving an optimal shape for the rocket engine. In particular, it is frequently desirable to provide a rocket engine which is of pencil-like configuration, that is, which has a slender elongated configuration having minimal cross-sectional area or diameter.

It is, therefore, an object of this invention to provide a rocket engine structure in which such a slender elongated over-all configuration can be achieved without sacrificing combustion chamber burning area or resultant thrust producing capabilities of the rocket.

It is a further object of this invention to provide such a rocket engine in which the combustion chamber is mounted entirely inside of the fuel tank and is provided with a plurality of fuel extrusion apertures arranged longitudinally of the combustion chamber.

It is a further object of this invention to provide such a rocket engine in which a combustion chamber is mounted entirely inside of the fuel tank and wherein a cutting cylinder is slidably mounted inside the fuel tank to selectively open or close a plurality of fuel extrusion apertures in the sides of the combustion chamber so as to quickly and positively stop or restart the operation of the engine.

It is a further object of this invention to provide a gelatinous mono-propellant fueled rocket engine structure such that virtually any desired fuel burning area may be incorporated in the combustion chamber without adversely affecting the over-all aero-dynamic design of the rocket engine.

Other objects, features, and advantages of the present invention will be more fully apparent to those skilled in the art from the following detailed description taken in connection with the accompanying drawing in which like reference characters refer to like parts throughout and wherein:

The single FIGURE of the drawing is a diagrammatic view partly in section of a rocket engine structure in accordance with the present invention.

Turning now to the drawing, there is shown a rocket engine comprising a fuel tank 11 adapted to contain a fuel 12 which, by way of example, may preferably be a gelatinous mono-propellant fuel. Suitable gelatin mono-propellants have recently been developed which combine many of the advantages and eliminate many of the disadvantages of both solid and liquid propellants. Such gelatin mono-propellant fuels are extrudible plastic viscous slurrys or gelatinous materials. Numerous suitable mono-propellant mixtures can be made into this form. Such mixtures preferably comprise a stable dispersion of a finely divided insoluble solid oxidizer in a continuous matrix of an oxidizable liquid fuel. The liquid fuel can be any oxidizable liquid, preferably an organic liquid containing carbon and hydrogen. Such liquid fuels include hydrocarbons such as triethyl benzine, dodecane and the like; compounds containing oxygen linked to a carbon atom such as esters including methyl maleate, diethyl phthalate, butyl oxalate, and the like; alcohols such as benzyl alcohol, triethylene glycol and the like; ethers such as methyl o-naphthyl ether and the like, and many others.

The solid oxidizer can be any suitable active oxidizing agent which yields an oxidizing element such as oxygen, chlorine, or fluorine readily for combustion of the fuel and which is insoluble in the liquid fuel vehicle. Such oxidizers include inorganic oxidizing salts such as ammonia, sodium and potassium perchlorate or nitrate and metal peroxides such as barium peroxide.

Finely divided solid metal powders, such as aluminum or magnesium may be incorporated in the mono-propellant composition as an additional fuel component along with the liquid fuel. Such metal powders possess the advantages both of increasing the fuel density and improving the specific impulse of the mono-propellant because of their high heats of combustion.

Gelling agents for imparting desired cohesiveness and flow characteristics to the plastic mixture include natural and synthetic polymers such as polyvinyl chloride, polyvinyl acetate, cellulose esters such as cellulose acetate, cellulose ethers such as ethyl cellulose, metal salts of higher fatty acids such as the sodium or magnesium stearates and palmitates.

The amount of oxidizer is preferably at a stoichiometric level with respect to the liquid fuel, although minimum concentrations of solid oxidizer as low as 40% by weight are operative. In general, the oxidizer will constitute about 65% by weight of the mixture. A preferred operative gelatinous mono-propellant includes a gel composed of up to 50% by weight of a liquid fuel, from 40% to 65% by weight of an oxidizer and from 3% to 10% of a gelling agent. A specific operative fuel can be composed of about 50% by weight of solid oxidizers such as potassium perchlorate, about 45% by weight of liquid fuels such as triethyl benzene, and about 5% by weight of a gelling agent such as ethyl cellulose. It is to be understood, however, that this invention is not limited to use with any particular fuel or, in fact, to use with any particular gelatinous mono-propellant mixture, but rather is directed to a rocket engine structure which may be used with any suitable fuel of which the foregoing examples are illustrative only.

The fuel tank 11 is of generally cylindrical shape and may have an axial length which is large by comparison to its cross-sectional diameter. This is indicated in the drawing by the broken showing of the tank. The tank 11 may be constructed of any suitable metal, plastic, or similar material.

Mounted in the end wall *11a* of fuel tank 11 is a combustion chamber 13 which is also preferably generally cylindrical in shape and mounted coaxially with the longitudinal axis of the fuel tank 11. Combustion chamber 13 may be attached at its rearward end 13_a_ to the rearward end 11_a_ of the fuel tank by screw threading or any other suitable means. The forward portion 13_b_ of the combustion chamber 13 may conveniently be supported within the fuel tank by a spider arrangement having a plurality of arms such as the arms 14 which spaces the combustion chamber away from the sides of the fuel tank. After the combustion chamber 13 has been inserted in the fuel tank 11, a thrust generating discharge nozzle 15 may be attached to the fuel tank and positioned to receive gases generated in the combustion chamber. The nozzle 15 may, for example, have its inlet 16 positioned adjacent the open end of the combustion chamber 13 by means of a threaded shoulder 15_a_ which may be received within the combustion chamber 13. Additionally or alternatively, a flange member 15_b_ on the nozzle 15 may be secured to the fuel tank 11 in any convenient manner. Of course, it will be understood that the fuel tank 11 and nozzle 15 could also be constructed as an integral unit and that the combustion chamber 13 could be inserted from the forward end of the fuel tank 11.

At the forward end of the fuel tank 11, or, alternatively, positioned remotely from the fuel tank, is a source of inert gas under pressure. As shown in the drawing, this source comprises a tank 17 which forms the forward wall of the fuel tank 11 and which may, for example, contain nitrogen under pressure. Lining the fuel tank 11 and attached to the rearward end 11_a_ thereof is a collapsible rubber bag 32 which surrounds combustion chamber 13 and when underformed extends forwardly to a transverse frontal portion 32_a_ positioned just in back of the front wall of the fuel tank. The flexible bag 32 is adapted to collapse by gas pressure applied between it and the tank 11 to push or extrude the fuel 12 in the fuel tank through a plurality of apertures 18 defined longitudinally along the side wall of the cylindrical combustion chamber 13.

The nitrogen tank 17 is connected through a conduit 19 to a branch conduit 20 leading to a point at the forward end of the fuel tank 11 such that gas may be admitted to the fuel tank between it and the liner bag 32. A valve 21 is preferably interposed in branch conduit 20 to regulate the pressure of the inert gas admitted to the tank so as to control the rate at which fuel is extruded by the collapsible bag. It will, of course, be understood that the thrust developed by the rocket is a function of the total burning area of the fuel in the combustion chamber and of the rate at which fuel is extruded into the combustion chamber. The extrusion rate, in turn, is determined by the rate at which the bag 32 is collapsed which is controlled by the pressure of the inert gas applied thereto. Valve 21 may be manually set before starting the operation of the rocket to maintain any predetermined desired constant pressure in back of plunger 18, or valve 21 may be controlled in any known manner to develop a predetermined variably programmed pressure in back of the plunger. In particular, the valve 21 may be controlled in response to combustion chamber pressure so as to vary the extrusion rate to maintain a constant combustion chamber pressure in accordance with systems of control which do not form a part of the present invention.

The conduit or line 19 also extends to a second branch conduit 22 having a valve 23 interposed therein. Valve 23 may also be either manually or remotely operated in response to electrical actuation. The conduit 22 extends through the side of the fuel tank 11 and has a portion 22_a_ which may form a part of the spider supporting the rearward end of the combustion chamber 13.

Mounted within the combustion chamber 13 is a fuel cutting cylindrical member 24 which is biased to its normal retracted position within the forward end 13_b_ of the fuel chamber 13 by a spring 25 which is attached to the forward wall 13_c_ of the combustion chamber 13 and to the forward wall 24_a_ of the fuel cutting cylinder. The conduit section 22_a_ enters the forward portion 13_b_ of the combustion chamber between its forward wall 13_c_ and the normal position of the forward wall 24_a_ of cutting cylinder 24. When valve 23 is opened, to admit pressurized inert gas in back of the wall 24_a_, the cutting cylinder 24 which is slidably mounted in sealed relationship within the combustion chamber 13 is urged toward the rearward end thereof against the action of spring 25. Shoulder member 15_a_ of nozzle 15 may also conveniently act as a stop to limit the travel of the cutting cylinder 24. Of course, when the cylinder 24 has been moved rearwardly in the combustion chamber 13 thereby closing the apertures 18 so as to prevent extrusion of fuel from tank 11 into the combustion chamber 13, it may be returned to its normal position shown in the drawing by closing valve 23 and opening a valve 26 in a conduit 27 to release the gas in back of the wall 24_a_ of the cylinder to ambient atmosphere. It will, of course, also be understood that the valve 23 could be a three-way valve so that the function of valve 26 could be combined therewith. When the gas is thus released, the spring 25 retracts the cutting cylinder 24 to its normal position shown in the drawing.

It will be noted that the cutting cylinder 24 throughout most of its length has an outer diameter which is substantially equal to the inner diameter of the combustion chamber 13 so that the cutting cylinder fits snugly in slidably mounted relationship within the combustion chamber. At the rearward end of the side wall of the cylinder 24, however, is a reduced diameter shoulder portion 24_b_ upon which may be mounted an annular heating element 28 which may serve as an igniter to start combustion of the fuel in the combustion chamber when the cutting cylinder is retracted from its extended to its normal position. The heating element 28 may be of the so-called hot wire electrically actuated type and may for example, be a resistance heating element of the type known commercially under the trade name of "Calrod." The electrical heating element 28 may be supplied through an electrical circuit including a cable 29 which enters through a sealed connector in the side wall of fuel tank 11 and may conveniently be carried through an arm 14 of the supporting spider and thence to the chamber in back of cylinder wall 24_a_ where excess wire may be accumulated to accommodate the motion of the cylinder. The cable 29 then extends through or upon the side wall of cylinder 24 to the annular heating element 28. Heating element 28 may be connected through cable 29 and a switch 30 to one terminal of a source of electrical power such as the battery 31, the other side of which is grounded. It will, of course, be understood that the circuit may be completed either by internally grounding the other end of the heating element 28 or by extending two separate conductors from the two terminals of battery 31 through switch 30 and cable 29 to the two ends of the heating element.

In order to minimize the possibility of heat leakage through the walls of combustion chamber 13 which might tend to melt or otherwise adversely affect the flow characteristics of some gelatinous nonpropellents, a jacket 33 is preferably provided around the outside of the combustion chamber assembly. Of course, provision is made to extend apertures 18 through the jacket. Any convenient cooling or heat exchange medium may be supplied to the jacket 33 through a conduit 34 and withdrawn therefrom through conduit 35. Although these conduits are shown for clarity as separate structures, it will be understood that they would in practice preferably also constitute arms of the spider supporting the forward end of the combustion chamber assembly. The heat exchange medium may be ambient air or it may be any convenient fluid which can be stored in a separate or integral tank (not shown). If conduits 34 and 35 project through the side of the tank they should, of course, be sealed at the point of entry. Alternatively these conduits may extend integrally with the inside wall of the fuel tank between it and the liner to the forward end of the fuel tank to an appropriate source and sink respectively for cooling medium. Of course, any suitable conventional sliding seal is also provided at any point where any conduit projects through bag 32.

It will be noted that the fuel extrusion apertures or nozzles 18 extend longitudinally along the side wall of the combustion chamber 13 and that these apertures may conveniently begin near the point occupied by the end **24*b* of cutting cylinder 24 when it is in its normal retracted position and may extend rearwardly to the outlet end of the combustion chamber which opens directly into the inlet 16 of nozzle 15. It will, of course, be understood that the size of each of the apertures and the number of apertures as well as the axial length of the combustion chamber 13** may be varied at will to meet the design requirements of any particular rocket application. In any such application, however, the fact that the fuel extrusion apertures are disposed longitudinally along the side wall or walls of a combustion chamber positioned actually entirely inside of the fuel tank makes it possible to achieve a total fuel burning area which is greater than the cross-sectional area of the fuel tank. This relationship obviously cannot be achieved where, as in prior rockets, the fuel extrusion apertures or nozzles are positioned on a frontal cross-sectional area which is transverse to the longitudinal axis of the fuel tank.

In operation, it will of course be understood that the combustion chamber containing the cutting cylinder is first assembled into the fuel tank and the discharge thrust nozzle then attached. If desired, for ground handling, a frangible foil or other sealing means may be placed over the apertures 18 to prevent leakage of the fuel before the engine is started. Alternatively, of course, the fuel cutting cylinder could be so arranged that the spring 25 urges it to a position in which it normally closes the apertures 18. In such an arrangement, of course, the conduit 22 would be positioned so that opening of valve 23 to apply pressurized gas through the conduit would displace the cylinder to a position such as shown in the drawing to open the apertures. In either of these possible arrangements, it may be convenient to first assemble the jacket combustion chamber, the nozzle and the bag 32 containing a charge of gelatinous fuel with bag 32 attached to cooling jacket 33 and with conduits 34, 35, 14, etc. projecting therethrough ready for attachment (by any convenient means not shown) either to external or internal forwardly projecting continuations thereof. The front wall of the fuel tank which, as shown, may comprise the pressurized gas tank 17, is then attached in any convenient manner. When it is desired to start the engine, valve 26 is closed and valve 23 is opened to position the fuel cutting cylinder 24 in its extended position with the igniter 28 resting adjacent the shoulder **15*c* of nozzle 15. Switch 30 is then closed to energize the heating element 28 and valve 21 is opened to admit pressurized gas in back of bag 32 to thereby apply pressure to the fuel 12 in fuel tank 11. The valve 23 is next gradually closed and valve 27 is opened to permit spring 25 to retract the fuel cutting cylinder 24 from the rearward end of the combustion chamber to the position shown in the drawing. As the main body of the cylinder 24 slides past each of the apertures 18 these apertures are opened to permit fuel to be extruded from the fuel tank through the apertures and into the combustion chamber. As the fuel is extruded, it is ignited by the heating element or other igniting means 28 in order to generate gas by combustion of the fuel in the combustion chamber. Such generated gases are, of course, discharged through the nozzle 15** to generate thrust.

Although it is possible to stop the burning of monopropellant fuels of the character described above simply by closing valve 21 so as to stop extrusion of the fuel, the action of the fuel cutting cylinder is in many applications desirable in order to provide a faster and more positive cut-off when it is desired to stop the rocket engine. It should, however, be understood that the advantage gained from the longitudinal axial arrangement of the apertures 18 with respect to the burning area which can be achieved therefrom is not necessarily dependent upon the use of the cutting cylinder 24 and that the action of the engine could be stopped simply by stopping fuel extrusion without using the cutting cylinder. In the above-described preferred illustrative embodiment, however, the rocket engine may be quickly and positively stopped by closing valve 26 and opening valve 23 to admit gas under pressure in back of the cutting cylinder 24 thereby forcing it rearwardly into the combustion chamber 13 to close the apertures 18 and prevent further extrusion of fuel into the combustion chamber. When it is again desired to start the rocket engine, the same procedure outlined above for initial starting is repeated and the engine may, thereby, be restarted without reloading the fuel tank.

As noted above, although the valves 21, 23 and 26 and the switch 30 are shown as being manually operated elements, it will be understood that any of these elements could be automatically controlled by any known system. It will further be understood that although the conduits 19, 20 and 22 and the valves 21, 23 and 26 have been shown as being external to the fuel tank 11, these elements could readily be mounted along the inside wall of the fuel tank if such positioning were desirable in any given aero-dynamic design.

While a particular exemplary preferred embodiment of the present invention has been described in detail above, it will be understood that modifications and variations therein may be effected without departing from the true spirit and scope of the novel concepts of the invention as defined by the following claims.

I claim as my invention:

1. A gelatinous mono-propellant fueled rocket engine comprising, a fuel tank adapted to contain said fuel, a combustion chamber inside of said fuel tank, at least one wall of said combustion chamber providing an inner wall for said fuel tank and defining a plurality of apertures arranged longitudinally of said combustion chamber and communicating with the interior of said fuel tank, means to force said fuel from said fuel tank through said apertures and into said combustion chamber, means to ignite said fuel in said combustion chamber to generate gases, means mounted for longitudinally slidable movement in said combustion chamber to close said apertures to prevent fuel from entering said combustion chamber, and a nozzle having one end in open communication with said combustion chamber to receive said gases and having its other end open to the ambient to discharge gases of combustion to generate thrust.

2. A gelatinous mono-propellant fueled rocket engine comprising, a generally cylindrical fuel tank adapted to contain said fuel, a generally cylindrical combustion chamber mounted coaxially inside of said fuel tank and having one end opening through an end wall of said fuel tank, the side wall of said combustion chamber defining a plurality of apertures arranged longitudinally thereof and communicating with the interior of said fuel tank, means to force fuel from said fuel tank through said apertures into said combustion chamber, a generally cylindrical cutting member slidably mounted coaxially within said combustion chamber, said cutting member being normally biased to a position in which said apertures are unobstructed thereby, means to slide said cutting member to a position in said combustion chamber in which it prevents the passage of said fuel through said apertures, and an electrically actuated heating element mounted on one end of said cutting member to ignite fuel forced through said apertures when said cylinder is retracted to said normal position, and a nozzle having one end in open communication with said combustion chamber to receive gases generated from said fuel in said combustion chamber, said nozzle having its other end in open communication with the ambient to discharge said gases to generate thrust.

3. A gelatinous mono-propellant fueled rocket engine comprising, a fuel tank adapted to contain said fuel, a combustion chamber entirely inside of said fuel tank, at least one wall of said combustion chamber defining a plurality of apertures arranged longitudinally of said combustion chamber and communicating with the interior of said fuel tank, the total area of said apertures being greater than the maximum cross-sectional area of said fuel tank, means to force said fuel from said fuel tank through said apertures and into said combustion chamber, means to ignite said fuel in said combustion chamber to generate gases, means slidably mounted in said combustion chamber and movable from a first position in which said apertures are unobstructed thereby to a second position such as to close said apertures to prevent movement of fuel therethrough, and a nozzle having one end in open communication with said combustion chamber to receive said gases and having its other end open to the ambient to discharge gases of combustion to generate thrust.

4. A gelatinous mono-propellant fueled rocket engine comprising, a generally cylindrical fuel tank adapted to contain said fuel, a generally cylindrical combustion chamber mounted coaxially inside of said fuel tank and having one end opening through an end wall of said fuel tank, a jacket for a cooling medium in the wall of said combustion chamber, the inner diameter of said fuel tank being greater than the outer diameter of said combustion chamber, the side wall of said combustion chamber defining a plurality of apertures arranged longitudinally thereof and communicating with the interior of said fuel tank, the sum of the areas of said plurality of apertures being greater than the maximum cross-sectional area of said fuel tank, collapsible bag means to force fuel from said fuel tank through said apertures into said combustion chamber, a generally cylindrical cutting member slidably mounted coaxially within said combustion chamber, said cutting member being normally spring biased to a position in which said apertures are unobstructed thereby, means to admit pressurized gas in back of said cutting member in said combustion chamber to slide said cutting member to a position in said combustion chamber in which it prevents the passage of said fuel through said apertures, an electrically actuated heating element mounted on one end of said cutting member to ignite fuel forced through said apertures when said cylinder is retracted to said normal position, and a nozzle having one end in open communication with said combustion chamber to receive gases generated from said fuel in said combustion chamber, said nozzle having its other end in open communication with the ambient to discharge said gases to generate thrust.

5. A gelatinous mono-propellant fueled rocket engine comprising, a fuel tank adapted to contain said fuel, a combustion chamber, at least one wall of said combustion chamber being positioned inside of said fuel tank and defining a plurality of apertures therein communicating with the interior of said fuel tank, means to force said fuel from said fuel tank through said apertures into said combustion chamber, means slidably mounted in said combustion chamber and movable therein from a first position in which said apertures are unobstructed thereby to a second position in which it closes said apertures to prevent the passage of said fuel therethrough, means to ignite said fuel in said combustion chamber to generate gases, and a nozzle having one end in communication with said combustion chamber to receive said gases, said nozzle having its other end open to the ambient to discharge said gases to generate thrust.

References Cited in the file of this patent

UNITED STATES PATENTS

| | | |
|---|---|---|
| 1,793,640 | Schilling | Feb. 24, 1931 |
| 2,217,649 | Goddard | Oct. 8, 1940 |
| 2,555,080 | Goddard | May 29, 1951 |
| 2,589,215 | Atwood | Mar. 18, 1952 |
| 2,671,312 | Roy | Mar. 9, 1954 |
| 2,689,453 | Goddard | Sept. 21, 1954 |
| 2,711,630 | Lehman | June 28, 1955 |
| 2,733,726 | Kaufman et al. | Feb. 7, 1956 |
| 2,753,801 | Cumming | July 10, 1956 |
| 2,940,256 | Conyers et al. | June 14, 1960 |

FOREIGN PATENTS

| | | |
|---|---|---|
| 582,621 | Great Britain | Nov. 22, 1946 |